US012751469B2

(12) United States Patent
Lai et al.

(10) Patent No.: US 12,751,469 B2
(45) Date of Patent: Oct. 6, 2026

(54) COMPOUND FORMULA OF BUTYRATE AND DERIVATIVES THEREOF AND BENZOIC ACID, AND PREPARATION METHOD THEREFOR AND APPLICATION THEREOF AS FEED ADDITIVE

(71) Applicant: SINGAO (XIAMEN) AGRIBUSINESS DEVELOPMENT CO., LTD., Fujian (CN)

(72) Inventors: Zhouwen Lai, Forrest Hill (NZ); Liang Zhang, Fujian (CN)

(73) Assignee: SINGAO (XIAMEN) AGRIBUSINESS DEVELOPMENT CO., LTD., Fujian (CN)

( * ) Notice: Subject to any disclaimer, the term of this patent is extended or adjusted under 35 U.S.C. 154(b) by 1099 days.

(21) Appl. No.: 17/727,914

(22) Filed: Apr. 25, 2022

(65) Prior Publication Data

US 2022/0248715 A1 Aug. 11, 2022

Related U.S. Application Data

(62) Division of application No. 15/768,472, filed as application No. PCT/CN2015/092045 on Oct. 15, 2015, now abandoned.

(51) Int. Cl.

*A23K 20/105* (2016.01)
*A23K 20/111* (2016.01)
*A23K 20/22* (2016.01)
*A23K 40/10* (2016.01)

(52) U.S. Cl.

CPC .......... *A23K 20/105* (2016.05); *A23K 20/111* (2016.05); *A23K 20/22* (2016.05); *A23K 40/10* (2016.05); *A23V 2002/00* (2013.01); *A23V 2200/32* (2013.01)

(58) Field of Classification Search

CPC .... A23K 20/105; A23K 20/111; A23K 40/10; A23K 20/22; A23K 50/30; A23K 50/60; A23K 20/158; A23K 20/163; A23V 2002/00; A23V 2200/32; A23V 2250/511; A23V 2250/5114; A23V 2250/5118; A23V 2250/54252; A23V 2300/10; A23V 2300/31; A23N 17/007

See application file for complete search history.

(56) References Cited

U.S. PATENT DOCUMENTS

| | | | |
|---|---|---|---|
| 7,001,625 B2 | 2/2006 | Van Dyck et al. | |
| 2007/0004805 A1 | 1/2007 | Jobdevairakkam et al. | |
| 2007/0212446 A1 | 9/2007 | Jansson et al. | |
| 2010/0234460 A1 | 9/2010 | Foret et al. | |
| 2011/0008388 A1* | 1/2011 | Navarro | A23K 50/30 424/274.1 |
| 2015/0118203 A1 | 4/2015 | Boyette et al. | |
| 2016/0128358 A1 | 5/2016 | Pablos Perez | |

FOREIGN PATENT DOCUMENTS

| | | | |
|---|---|---|---|
| CN | 102450519 | A | 5/2012 |
| CN | 103504137 | A | 1/2014 |
| CN | 104543579 | A | 4/2015 |
| JP | 2009-500345 | A | 1/2009 |
| KR | 10-2007-0081903 | A | 8/2007 |
| WO | 9624247 | A1 | 8/1996 |

OTHER PUBLICATIONS

Mazzoni et al., "Supplemental Sodium Butyrate Stimulates Different Gastric Cells in Weaned Pigs," *The Journal of Nutrition* 138: 1426-1431, 2008.

Papatsiros et al., "The use of organic acids in monogastric animals (swine and rabbits)," *Journal of Cell and Animal Biology* 6((10): 154-159, 2012.

Bühler et al, "Influence of benzoic acid in high fibre diets on nutrient digestibility and VFA production in growing/finishing pigs," *Archives of Animal Nutrition* 63(2): 127-136, 2009.

Non-final Office Action of corresponding KR application (KR20187013270) Apr. 19, 2022.

Final Office Action of corresponding KR application (KR20187013270) Oct. 17, 2022.

Non-final Office Action of corresponding KR application (KR20187013270) Apr. 5, 2023.

Notice of Final Rejection of corresponding KR application (KR20187013270) Aug. 8, 2023.

Re-exam Office Action of corresponding KR application (KR20187013270) Sep. 11, 2023.

Notice of Final Rejection of Re-exam of corresponding KR application (KR20187013270) Nov. 15, 2023.

Third Office Action of corresponding CA application (CA3005160) Oct. 31, 2022.

Office Action of corresponding EP application (EP15906064.9) Oct. 19, 2022.

* cited by examiner

*Primary Examiner* — Michele L Jacobson
*Assistant Examiner* — Carrie Glimm
(74) *Attorney, Agent, or Firm* — Sughrue Mion, PLLC

(57) ABSTRACT

The present application discloses a composition of a butyrate or a derivative thereof and benzoic acid, preparation method and use as a feedstuff additive thereof, wherein the composition comprises 5 wt % to 50 wt % of the butyrate or the derivative of butyric acid, and 50 wt % to 95 wt % of the benzoic acid or benzoate. The benzoate and butyrate dissociate into acidic molecules when they enter into animals' bodies. The butyric acid stimulates parietal cells to grown and the parietal cells produce hydrochloric acid, which thereby reduces the pH value in the stomach. Benzoic acid can inhibit facultative anaerobes such as *Lactobacillus* and butyric acid-producing anaerobic bacteria in the stomach, rendering the two floras become predominant microflora, and therefore produce more endogenous organic acids such as lactic acid and butyric acid. These acids are beneficial to gastrointestinal health and animal growth. As a result, a synergy effect of the two components in the composition is achieved.

8 Claims, No Drawings

COMPOUND FORMULA OF BUTYRATE AND DERIVATIVES THEREOF AND BENZOIC ACID, AND PREPARATION METHOD THEREFOR AND APPLICATION THEREOF AS FEED ADDITIVE

This is a divisional of application Ser. No. 15/768,472 filed Apr. 13, 2018, which is a national stage entry of PCT/CN2015/092045, filed Oct. 15, 2015, the contents of all of which are incorporated herein by reference in their entirety.

TECHNICAL FIELD

The present application relates to the field of feedstuff additives, especially the feedstuff additive that can manipulate a microbial flora in the gastrointestinal tract of an animal.

BACKGROUND ART

Sodium butyrate (or butyrate and other derivatives of butyric acid) can provide a quick and easy-to-absorb energy source for an animal organism and tissue cells. The active ingredient of sodium butyrate is butyric acid, which is a short-chain volatile fatty acid. Butyric acid begins to play a role after it passes through the stomach and arrives at the small intestine. It is a favorite energy source for intestinal cells, particularly cecum cells and colon cells. As the main energy source for colonic mucosa epithelial cells, it yields about 70% of the energy produced in SCFA (Short-Chain Fatty Acid) oxidation and is absorbed very easily in the intestinal lumen. Butyric acid carries out an energy metabolism through f-oxidation in the hydroxymethylglutaryl coenzyme A cycle in intestinal epithelial cells. Butyric acid is firstly transformed into butyric acid coenzyme A via butyric acid coenzyme A synthetase, and then acetyl coenzyme A is rapidly produced via a series of reactions to perform the energy metabolism. A short-chain volatile fatty acid (SCFA) can provide up to 30% maintenance energy for hind digestive tract developed animals, and thereby improve the growth of intestinal chorion. Sodium butyrate can adjust the gastrointestinal microecological balance of an animal. It can improve the growth of probiotics in gastrointestinal tract, inhibit the growth of pernicious bacteria, and thereby make the gastrointestinal microecosystem in a positive balance. A very important characteristic of a health gastrointestinal tract is a coordinated balance of microorganisms therein, especially for a young animal. An in vitro study showed that when glucose, ketone body, glutamine and the like were used as a respiratory energy source for animals, colonic epithelial cells would utilize butyric acid firstly. Almost all of the butyric acid can be absorbed and utilized by intestinal epithelial cells. An isotope tracing indicated that butyric acid could enter the human body blood circulation, and could be metabolized by almost all of the body tissues. In peripheral tissues, butyric acid can be oxidized quickly to be used in fat synthesis, and also can enter the mammary gland to synthesize milk fat.

Buhler el al (2009) reported that the content of butyric acid in cecum and rectum of growing pigs was significantly increased by adding 0.5% benzoic acid to a feedstuff. The addition amount of benzoic acid in a feedstuff for growing-fattening pigs approved by the European Union is in a range of 0.5%-1.0%. Although there is no limitation to the amount of benzoic acid in a feedstuff in China, a recommended addition amount of benzoic acid used as an acidifier is also about 0.5%-1.0%.

The International Publication No. WO2009068622A1 described a phagostimulant containing 0.05%-0.25% of benzoic acid, 0.25%-1% of benzyl butyrate, 0.2%-2% of butyric acid and an ester thereof and so on as a mixture, however, it belongs to a flavor and fragrance formulation.

In the existing technologies, sodium butyrate is added alone to a feedstuff. It reaches the intestinal tract through the utilization of a coating technology, and then plays a role therein. However, there are not enough hydrogen ions at the hind intestinal tract to form enough butyric acid molecules. Moreover, an excessive amount of sodium butyrate cannot be added to the feedstuff, because an excessive amount of sodium butyrate would affect the gastrointestinal tract balance. Therefore, it is necessary for animals to produce more butyric acid via self-metabolism to meet their growth requirement.

SUMMARY OF THE INVENTION

A purpose of the present application is to provide a composition of a butyrate or a derivative thereof and benzoic acid.

A further purpose of the present application is to provide use of a composition of a butyrate or a derivative thereof and benzoic acid as a feedstuff additive.

Another purpose of the present application is to provide a method for preparing a composition of a butyrate or a derivative thereof and benzoic acid.

In order to accomplish the above purposes, the composition of a butyrate or a derivative thereof and benzoic acid in the present application comprises 5 wt % to 50 wt % of the butyrate or the derivative of butyric acid, and 50 wt % to 95 wt % of benzoic acid or benzoate.

The composition may further comprise 0 wt % to 45 wt % of excipient.

The butyrate may be one or more of sodium butyrate, potassium butyrate, calcium butyrate, magnesium butyrate, and the like.

The excipient may be syrup, dextrin, whey powder, starch, water-soluble dietary fiber, chitosan, and the like.

Provided is use of a composition of a butyrate or a derivative thereof and benzoic acid as a feedstuff additive. The composition of the butyrate and benzoic acid is added to a feedstuff in an amount of 0.1 wt % to 0.5 wt % as an additive. Upon reaching the stomach of an animal, the composition of the butyrate and benzoic acid dissociates into butyric acid and benzoic acid molecules; the butyric acid stimulates parietal cells to grow and the parietal cells produce hydrochloric acid, which thereby reduces the pH value in the stomach to a range of 2.5-4.0, at which the benzoic acid can perform an optimal preservative effect and antimicrobial activity, rendering a butyric acid-producing anaerobic flora becomes a predominant microflora, and producing more endogenous organic acids, such as lactic acid and butyric acid; and consequently, a combination of butyric acid and benzoic acid can produce a synergy effect.

Provided is a method for preparing a composition of a butyrate or a derivative thereof and benzoic acid, comprising adding water to a reactor, then adding a hydroxide to the reactor under continuous stirring until the hydroxide is completely dissolved, gradually adding benzoic acid and dissolving it under stirring, then adding butyric acid under continuous stirring and controlling the temperature of the reaction solution not higher than 105° C. to produce a mixed solution of butyrate and benzoic acid (benzoate), cooling the reaction solution to a temperature of 60° C.-90° C. after completing the reaction; adjusting the pH value of the reaction solution to 8-10 by adding an appropriate amount of butyric acid or a basic salt; adding dextrin to the reaction solution in the reactor and dissolving it or forming a suspension under stirring, continuously cooling the reaction solution to a temperature of 25° C.-50° C.; then spray-drying the resulting mixture under an inlet air temperature of 150° C.-260° C. and an outlet air temperature of 65° C.-160° C., and finally, collecting dry powders via a cyclone separator or a vibrated fluidized bed to obtain microspheric particles of the butyrate and benzoic acid (benzoate), in which more than 95% are in a size range of 60-200 mesh.

In the above technical solutions, benzoate and butyrate dissociate into acidic molecules when they enter into animal's bodies. The butyric acid stimulates parietal cells to grown and the parietal cells produce hydrochloric acid, which thereby reduces the pH value in the stomach to lower than 4. The optimized pH value for the preservative effect and antimicrobial activity of benzoic acid is 2.5-4.0. Benzoic acid can inhibit fungi, molds and facultative anaerobes in the stomach. *Lactobacillus* flora and butyric acid-producing anaerobic flora become predominant microflora, and therefore produce more endogenous organic acids such as lactic acid and butyric acid. These acids are beneficial to gastrointestinal health and animal growth. As a result, a synergy effect of the two components in the composition is achieved.

DETAILED DESCRIPTION OF THE EMBODIMENTS

The technical contents, structural features, purposes and effects of the present application are described in detail below in conjunction with embodiments.

The composition of a butyrate or a derivative thereof and benzoic acid in the present application comprises:

- 5 wt % to 50 wt % of the butyrate or the derivative thereof, wherein the butyrate is one or more of sodium butyrate, potassium butyrate, calcium butyrate, magnesium butyrate and the like, and the derivative of butyric acid is tributyrin and the like;
- 50 wt % to 95 wt % of benzoic acid (sodium benzoate); and
- 10 wt % to 20 wt % of excipient, wherein the excipient is syrup, dextrin, whey powder, starch, chitosan and the like.

For example, in the case of sodium butyrate and benzoic acid (sodium benzoate), the method for preparing the composition of a butyrate or a derivative thereof and benzoic acid in the present application is as follows:

- reacting an acid with a base: 1371, 1601, 1852 and 1445 parts by weight of water were added into 4 reactors (four examples), respectively; 321, 268, 283 and 158 parts by weight of sodium hydroxide were then respectively added under stirring until the sodium hydroxide was completely dissolved; 424, 594, 805 and 424 parts by weight of benzoic acid were gradually added into the reactors, respectively; the resulting mixtures were stirred and the benzoic acid was dissolved; then, 400, 160, 40 and 40 parts by weight of butyric acid were slowly added into the reactors, respectively, under continuous stirring and the temperatures of the reaction systems were controlled not higher than 105° C. to produce mixed solutions of sodium butyrate and sodium benzoate; the mixed solutions were cooled to a temperature of 60° C.-90° C. after the reaction was completed;
- the pH values of the mixed solutions were adjusted to 8-10 by adding an appropriate amount of butyric acid or a sodium-containing basic salt;
- 100 and 450 parts by weight of dextrin were added under stirring into the reaction solutions in the second and fourth reactors, respectively, and the dextrin was dissolved or formed a suspension under stirring;
- the reaction solutions were continuously cooled to a temperature of 25° C.-50° C.;
- spray-drying step: the resulting mixtures were spray-dried under an inlet air temperature of 150° C.-260° C. and an outlet air temperature of 65° C.-160° C.; the detailed drying conditions are listed in the table below; concurrently, the vaporized-gas produced during the spray-drying process was subjected to water film and spray dust-removal, and the dust-removing solution was recycled; and
- finally, dry powders were collected via a cyclone separator or a vibrated fluidized bed to obtain microspheric particles of sodium butyrate and sodium benzoate. In the four examples, the products comprise 50%, 20%, 5% and 5% of sodium butyrate; 50%, 70%, 95% and 50% of sodium benzoate; and 0%, 10%, 0% and 45% of dextrin, respectively.

| Items | | Example 1 | Example 2 | Example 3 | Example 4 |
|---|---|---|---|---|---|
| Reaction | Water (kg) | 1371 | 1601 | 1852 | 1445 |
| | Sodium hydroxide (kg) | 321 | 268 | 283 | 158 |
| | Benzoic acid (kg) | 424 | 594 | 805 | 424 |
| | Butyric acid (kg) | 400 | 160 | 40 | 40 |
| Excipient | Dextrin (kg) | 0 | 100 | 0 | 450 |
| Drying | Inlet air temperature (° C.) | 212 | 223 | 239 | 228 |
| | Outlet air temperature (° C.) | 96 | 108 | 115 | 111 |
| The content of sodium butyrate in the product | | 50% | 20% | 5% | 5% |
| The content of benzoic acid (sodium benzoate) in the product | | 50% | 70% | 95% | 50% |
| The content of dextrin in the product | | 0% | 10% | 0% | 45% |

The preparation method also can directly use sodium benzoate and water to mix with and to be dissolved in a butyrate reaction solution to form a mixed solution of the butyrate and benzoic acid (sodium benzoate) with or without the addition of excipient, and the mixed solution was then spray-dried to obtain uniform and stable microspheric particles.

The Feeding Test of the Products:

120 21-days-old weaned piglets were divided into 12 groups of 10 each. Test groups were fed with 9 types of diets and control groups were fed with 3 types of diets, respectively. After the pigs were continuously fed for 21 days, the number of glandular parietal cells in gastric acid secretion area, the contents of butyric acid in the stomach and jejunum, and the daily weight gain of each pig were measured.

| Groups | The weight ratio of butyric acid* to benzoic acid* | The weight percentage of the composition product in the feedstuff | The pH values in stomach | The number of parietal cells in each gastric gland (n) | The content of butyric acid in stomach (mol/g) | The content of clostridium butyricum in ileum (logCFU/g) | The content of butyric acid in ileum (mol/g) | Daily weight gain (g/day) |
|---|---|---|---|---|---|---|---|---|
| Test Groups (basal diet + sodium butyrate and sodium benzoate) | 5:95 | 0.1 | 3.1 | 41.1 | 0 | 5.47 | 6.8 | 333.3 |
| | | 0.15 | 3.0 | 42.8 | 0.2 | 5.91 | 7.7 | 343.7 |
| | | 0.3 | 2.9 | 43.7 | 0.5 | 6.15 | 8.6 | 344.9 |
| | 25:75 | 0.1 | 3.0 | 44.5 | 0.9 | 6.20 | 8.8 | 320.3 |
| | | 0.15 | 2.8 | 46.2 | 1.2 | 6.25 | 9.0 | 345.9 |
| | | 0.3 | 2.8 | 48.1 | 1.7 | 6.21 | 9.1 | 343.5 |
| | 50:50 | 0.1 | 2.9 | 44.5 | 1.1 | 5.61 | 8.5 | 324.5 |
| | | 0.15 | 2.8 | 48.3 | 2.5 | 6.35 | 9.3 | 344.3 |
| | | 0.3 | 2.7 | 49.2 | 2.9 | 6.86 | 10.3 | 358.4 |
| Control Group 0 (basal diet) | | | 3.2 | 39.2 | 0 | 5.12 | 1.7 | 315.6 |
| Control Group 1 (basal diet + 0.15% sodium butyrate) | | | 2.9 | 47.5 | 2.8 | 6.25 | 8.9 | 342.5 |
| Control Group 2 (basal diet + 0.5% sodium benzoate) | | | 3.0 | 42.3 | 0 | 5.57 | 5.6 | 338.5 |

The results show that: (1) the group added with 0.3% of the composition of sodium butyrate and sodium benzoate has a better effect than that of the group added with 0.5% of sodium benzoate alone; (2) the group added with 0.15% of the composition of sodium butyrate and sodium benzoate can achieve or exceed the effect of the group added with 0.15% of sodium butyrate alone; (3) the group added with sodium butyrate or sodium benzoate or the composition thereof has a lower pH value in stomach than the control group 0, and the pH value of the group added with the composition has a tendency to decrease in comparison with the control groups 1 and 2; (4) the group added with sodium butyrate or sodium benzoate or the composition thereof has a higher content of *Clostridium butyricum* in ileum than the control group 0, and the content of *Clostridium butyricum* in ileum of the group added with the composition has a tendency to increase in comparison with the control groups 1 and 2; (5) the group added with sodium butyrate or sodium benzoate or the composition thereof has a higher number of parietal cells and a higher content of butyric acid in ileum than the control group 0; and (6) the ileum is the main absorption site of the body, and the content of the butyric acid is not only affected by the amount of the feedstuff additive, but much more relies on the fermentation of a variety of anaerobic bacteria. All the test groups have a higher content of butyric acid in ileum than the control group 2.

The composition of butyric acid and benzoic acid added into the feedstuff, upon reaching the stomach of an animal, dissociates into acidic molecules. The butyric acid stimulates parietal cells to grow, and the parietal cells are cell anaerobic bacteria which produce hydrochloric acid. The parietal cells produce more hydrochloric acid which thereby reduces the pH value in the stomach. The effect of benzoic acid becomes apparent only in an acidic environment especially under a pH of less than 4. Benzoic acid inhibits microbes in the following three ways: (1) interfering with microbial enzyme system, destroying the normal metabolism thereof and inhibiting the activity of enzymes; (2) coagulating and denaturing the protein of the microbes, and thereby interfering with microbial survival and proliferation; and (3) changing the permeability of cytoplasmic membrane so that the enzymes and metabolites in the microbes escape, resulting in the inactivation of the microbes. Benzoic acid inhibits the molds and fungi ingested from a feedstuff. Facultative anaerobes such as *E. coli*, the members of Enterobacteriaceae such as *Enterobacter aerogenes*, etc., *Bacillus licheniformus* and *Saccharomyces cerevisiae* are inhibited. Facultative anaerobes enter the stomach through mouth along with the feedstuff. The pH value in the stomach of the animal was reduced to lower than 4. The optimized pH value for the preservative effect and antimicrobial activity of benzoic acid is 2.5-4.0, and benzoic acid inhibits facultative anaerobes in the stomach. Anaerobic bacteria (such as *Lactobacillus*) and butyric acid-producing anaerobic bacteria (such as *Butyrinum Flavonifractor plautii, Peptoniphilus gorbachii, Eubacterium nodatum, Megasphaera elsdenii, Eubacterium hadrum, Roseburia faecis, Roseburia hominis, Clostridium butyricum*) become predominant microflora, and therefore produce more endogenous organic acids such as lactic acid and butyric acid. These acids are beneficial to gastrointestinal health and animal growth.

A composition of butyric acid and benzoic acid is provided in the present application. The butyric acid stimulates parietal cells of an animal to grow and produce more hydrochloric acid, which thereby reduces the pH value in the stomach and provides a best acidic environment for the preservative effect and antimicrobial activity of benzoic acid. Benzoic acid can inhibit non-acidophilic bacteria such as *Salmonella* and *E. coli*, rendering acidophilic bacteria such as *Clostridium butyricum* become a predominant microflora, and therefore more butyric acid is produced. The combination of butyric acid and benzoic acid achieves a synergy effect described as 1+1>2, which belongs to the claimed contents of the present application.

In the prior art, the addition amount of benzoic acid in a feedstuff is 0.5% to 1%, while the addition amount of the composition product of the present application in a feedstuff is 0.1% to 0.5%, and the addition amount of benzoic acid in the feedstuff, based on the maximum content 95% of benzoic acid in the composition, is less than 0.5%. Although the prior art indicates that benzoic acid can enhance the content of butyric acid in the cecal and rectal contents of growing pigs, but does not suggest the synergy effect of the combination of benzoic acid and butyric acid in the stomach of an animal, namely, butyric acid reduces the pH value of gastric acid, and benzoic acid promotes the growth of the butyric acid-producing flora. Existing applications of butyric acid are in the form of being coated, so that the butyric acid moves quickly through the stomach of an animal into the cecum and rectum, which is helpful for the animal to absorb energy. Therefore, the prior art does not give a technical suggestion of the synergy effect of the combination of butyric acid and benzoic acid in the stomach of an animal in the present application.

The synergy effect brought about by using the technical solution of the present application can also be demonstrated by other feeding tests.

Example 1

72 28-days-old healthy and weaned piglets were randomly divided into two groups (test group A and control group B) of 36 each. The test group was fed with the diet with the addition of 3 kg product (which was prepared according to Formulation 1: 50% of sodium butyrate, 50% of sodium benzoate, and 0% of dextrin) per ton of the feedstuff. The control group was fed with the diet with the addition of 60 ppm salinomycin per ton of the feedstuff. The effect on the digestibilities of the nutrients in the weaned piglets was obtained, and the results are shown in the following table.

| Items | Test Group | Control Group |
|---|---|---|
| Energy | 83.24 | 80.85 |
| Dry Matter | 95.21 | 94.16 |
| Crude Protein | 82.95 | 81.98 |
| Phosphorus | 45.25 | 44.11 |
| Calcium | 47.74 | 46.80 |

The results show that: (1) the product of Formulation 1 improved the digestibilities of the nutrients in weaned piglets, wherein the digestibilities of the energy, the dry matter, the crude protein, the phosphorus and the calcium were improved by 2.96%, 1.12%, 1.18%, 2.58% and 2.01%, respectively; and (2) the product of Formulation 1 can be used instead of antibiotics, so it has good application prospects.

Example 2

20,000 1-day-old AA broilers were randomly divided into 2 groups of 10,000 each. The test group was fed with the diet with the addition of 1.5 kg product (which was prepared according to Formulation 2: 20% of sodium butyrate, 70% of sodium benzoate, and 10% of dextrin) per ton of the feedstuff during chick stage, and was fed with the diet with the addition of 0.9 kg of the product prepared according to Formulation 2 per ton of the feedstuff during young and adult stage. The feces of the test group were shaped 7 days later and can be recovered well, indicating that the broilers therein digested and absorbed well, whereas the feces of the control group were watery and soft, and there was a strong smell of ammonia in the chicken coops, indicating that the broilers therein did not digest and absorb completely.

Example 3

10 28-days-old weaned piglets with a weight of 4.24 kg, were randomly divided into two groups (test group A and control group B) of 5 each. The test group was fed with the diet with the addition of 2 kg product (which was prepared according to Formulation 3: 5% of sodium butyrate, 95% of sodium benzoate, and 0% of dextrin) per ton of the feedstuff. The control group was fed with the basal diet. After 42 days, the effect on the growth performances of the weaned piglets was obtained, and the results are shown in the following table.

| | Control Group | Test Group | Discrepancy (%) |
|---|---|---|---|
| Initial weight(kg) | 4.24 | 4.24 | / |
| Final weight(kg) | 23.7 | 26.02 | 8.92 |
| Weight gain (kg) | 19.46 | 21.48 | 9.4 |
| Daily feed intake (g/day) | 770.48 | 768.12 | −0.31 |
| ADG (g/day) | 463.32 | 518.58 | 10.66 |
| FCR | 1.66 | 1.48 | −12.16 |

The results show that the product of Formulation 3 can improve the growth performances of the weaned piglets, and the body weight gain, average daily weight gain (ADG) and feed conversion ratio (FCR) were improved by 9.4%, 10.66% and 12.16%, respectively.

In the present application, butyric acid and benzoic acid are reacted with basic metal ions (such as sodium, potassium, calcium, magnesium, zinc, etc.) in a certain ratio, and then the resulting product is spray-dried to form a composition of butyric acid and benzoate. No matter what kind of combination manners are used, for example, directly mixing butyrate and benzoic acid, or puffing and then coating them with lipid, or binding butyric acid and benzoic acid with divalent metal ions, or other combination manners of butyric acid and benzoic acid, all these manners are used for the purpose of achieving the synergy effect of butyric acid and benzoic acid, and they all fall within the protection scope of the present application.

The foregoing description illustrates the embodiments of the present application, and it is not intended to limit the protection scope of the present application. Any modifications of equivalent structures or equivalent processes made on the basis of the contents of the description of the present application, or direct or indirect applications in other related technical fields, also fall within the scope of patent protection of the present application.

The invention claimed is:

1. A method of increasing endogenous organic acids in an animal, the method comprising:

increasing endogenous organic acids in an animal by administering a composition to the animal, wherein the composition consisting of:

butyric acid or butyrate, and benzoic acid or benzoate, wherein the composition is administered to the animal via a feedstuff comprising 0.1-0.3 wt % of the composition, and wherein the ratio of butyric acid or butyrate to benzoic acid or benzoate is from 5:95 to 50:50.

2. The method of claim 1, wherein the composition comprises:

5 to 50 wt % of butyric acid or butyrate, and 50 to 95 wt % of benzoic acid or benzoate.

3. The method of claim 1, wherein the endogenous organic acids are selected from one or more from lactic acid and butyric acid.

4. The method of claim 1, wherein the butyric acid or butyrate acts synergistically with benzoic acid or benzoate to elevate the content of butyric acid in gastrointestinal tract of the animal.

5. The method of claim 4, wherein the gastrointestinal tract is stomach and/or ileum.

6. The method of claim 1, wherein the butyrate is one or more of sodium butyrate, potassium butyrate, calcium butyrate or magnesium butyrate.

7. The method of claim 1, wherein the feedstuff further comprises a basal diet.

8. The method of claim 1, wherein the animal is piglet or broiler.

* * * * *